2 Sheets—Sheet 1.

E. P. NEEDHAM.

Automatic Musical Instrument.

No. 8,451. Reissued Oct. 15, 1878.

*Witnesses:*

John Thomson

J. A. Rutherford

*Inventor:*

Elias P. Needham

By Merritt Gally atty.

E. P. NEEDHAM.

Automatic Musical Instrument.

No. 8,451. Reissued Oct. 15, 1878.

*Witnesses:*

John Thomson

J. A. Rutherford

*Inventor:*

Elias P. Needham

By Merritt Gally atty

UNITED STATES PATENT OFFICE.

ELIAS P. NEEDHAM, OF NEW YORK, N. Y.

IMPROVEMENT IN AUTOMATIC MUSICAL INSTRUMENTS.

Specification forming part of Letters Patent No. 197,048, dated November 13, 1877; Reissue No. 8,451, dated October 15, 1878; application filed July 9, 1878.

*To all whom it may concern:*

Be it known that I, ELIAS P. NEEDHAM, of the city, county, and State of New York, have invented certain new and useful Improvements in Mechanical Musical Instruments; and I do hereby declare that the following is a full and exact description of the same, reference being had to the accompanying drawings, and to the letters of reference marked thereon.

This invention has reference to improvements in automatic wind-instruments in which perforated paper or other material is automatically passed over, under, or between the air passages or ducts, and, acting as a valve, admits or excludes the wind, so as to produce the desired combination, succession, and duration of sounds; and consists in the arrangement of an endless apron, sheet, or belt, of any suitable material, and perforated with openings corresponding to the location of the notes to be sounded in succession or simultaneously, and the duration of the notes.

It further consists in the arrangement by which the perforated endless sheet is moved, guided, and retained, and the bellows operated to produce the desired combination of sounds.

It also consists of the peculiar arrangement of the case, by which one endless belt or sheet can be readily substituted for another, and the force and quality of the sound modified, as will be more fully set forth.

Figure 1:
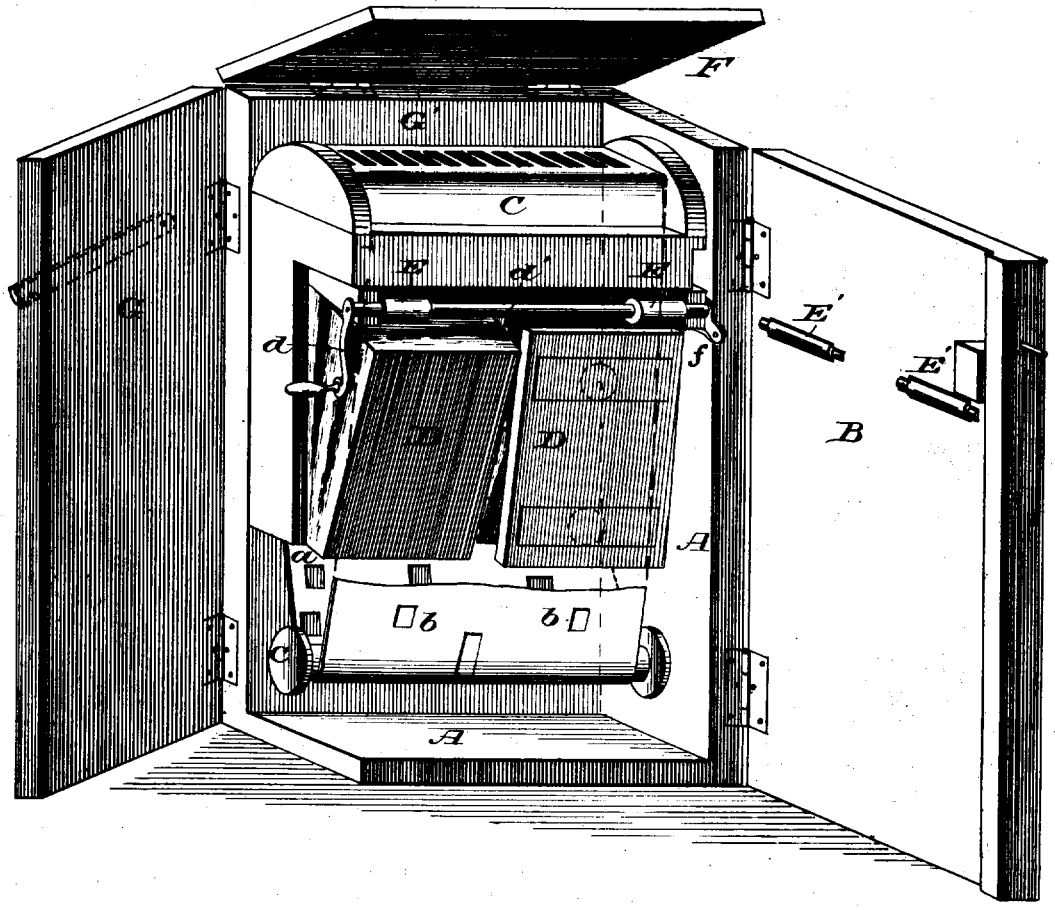
Figure 3:
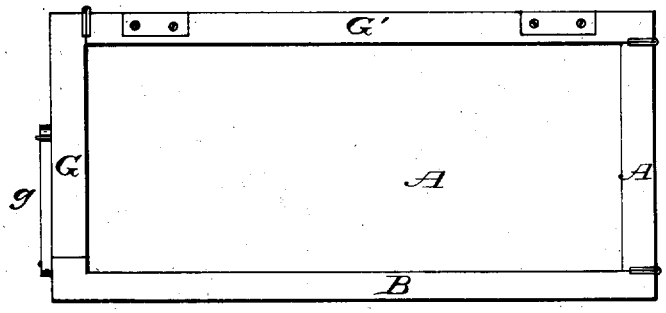
Figure 2:
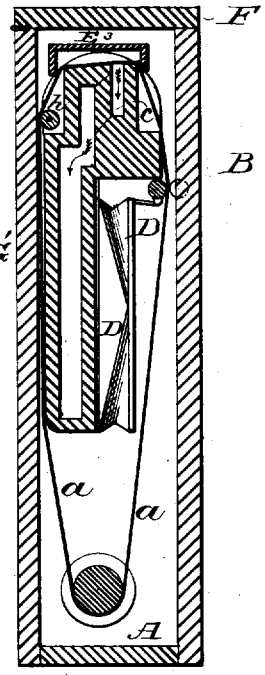

In the drawings, Figure 1 represents the instrument in perspective, the case being shown as opened and part of the endless sheet or belt being in broken lines, so as to show the rest more fully. Fig. 2 is a vertical section, showing the reed-chamber, with the reeds in the air-ducts placed in a vertical position, and at right angles to that part of the music-sheet where the air is admitted, the sheet passing over that end of the body of the reed to which the tongue of the reed is riveted, the air passing in the direction shown by arrows in Fig. 2, the bellows, the actuating-crank, the resonant cover, and the case inclosing the instrument and protecting the parts from dust and injury. The sides of the case are hinged, so that they may be readily opened and allow the endless sheet or belt to be inserted; and the top cover is also hinged and provided with suitable support, so that the sound may be regulated by the same. Fig. 3 shows the manner of hinging the different parts of the case together.

In the drawings, A designates the stationary portions of the case. B is the hinged side, to which the pressure-rollers are secured. These rollers, instead of being secured to the case, may be secured to a separate hinged strip.

C represents the reed-chamber; D D, the bellows; $E^3$, a resonant cover, placed over the reeds to concentrate and modify their tone, and which may be arranged so as to be partially or wholly withdrawn and replaced at will, to produce various musical effects of either a complete or partial swell or crescendo, or the reverse of either. It is shown in Fig. 2, but not in Fig. 1, as it would cover the reeds.

F is the top cover, hinged to the sides and provided with a stop, so that the same may be partially or entirely opened, and thus the force of the sound regulated or controlled. G is the hinged end, secured to the hinged side G′. The whole case is shown in Fig. 1 as hinged to the fixed vertical end and bottom A, so that the same may be readily opened and one endless sheet or belt substituted for another; but the case may be made without the hinged sides, and the whole instrument supported on a slide and upright similar to A A, so that the whole instrument may be withdrawn and the endless sheet or belt secured, or one substituted for another.

The bellows D D acts at all times when the instrument is in operation on all the reeds; but the air is excluded by the sheet or the endless belt, which acts as a valve on all the reeds. As, however, openings are cut into the sheet to correspond with the successive or simultaneous notes or sounds and their duration, the corresponding reed will be sounded when and as long as the opening is over the reed, so that air can be admitted to the reed and the tongue vibrated.

*b b* are the holes or openings in the endless sheet, band, or belt, and their location with reference to the reeds represents the note in the reed, while their length regulates the duration of the note. *c* is a tension or guide roll suspended within the endless band or sheet *a*, so as to keep the sheet straight and even.

When a sheet of music of the ordinary length is to be used, the height of the instrument is such that the roller *c* can be suspended in the sheet. When, however, a sheet of music of more than ordinary length is to be used, two or more of the suspending-rollers may be used by inserting one or more stationary rolls, revolving on their axis, and passing the sheet under a suspended roll, then upward over a fixed roll, and again under a suspended roll, from which it passes upward to and over or between the air-ducts or reeds, so that in a properly-arranged case music of any length can be inserted and automatically played.

*d* is a crank secured to the end of the shaft *d'*, by which the same is turned. E E are driving-pulleys secured to the shaft *d'*. They may be made of rubber or other elastic yielding material.

$E^1$ $E^1$ are pressure-rolls arranged to press against the pulleys E E and rotate with the same, and so propel the sheet of music between them evenly and uniformly.

The rollers $E^1$ $E^1$ may also be made of elastic or yielding material; or they may be mounted in elastic or yielding bearings, so that when the sheet or band of perforated music is inserted the pulleys E E and rolls $E^1$ $E^1$ will hold the sheet firmly, and on turning the crank *d* the sheet or band will not slip on the pulleys E E.

*f* is the crank by which the bellows are operated. There may be one or more cranks to operate the bellows, or they may be operated by other means from the shaft *d'*.

*g* is a clamp, by means of which the hinged piece B, carrying the rolls $E^1$ $E^1$, is held, so that the rolls rest firmly against the pulleys E E.

*h* is a guide-roll inserted to keep the endless sheet off the sides of the instrument. Such guide-rolls may be arranged in other places to insure the free working of the sheet *a*.

The instrument is operated as follows: An endless sheet, *a*, perforated with holes corresponding with the notes of the music desired, is placed over the reed-chest C, and the roller *c*, provided with the projecting rims or guides, is inserted so as to keep the sheet straight and even. The case is now closed, and the rollers $E^1$ $E^1$ press the sheet against the pulleys E E. The crank is turned, operating the bellows, and also moving the endless perforated sheet or belt over the reeds and admit air at the proper time to the proper reed, so as to cause a succession of sounds or chords of varying duration, and thus produce the desired time or harmony in the measure of time regulated by the revolution of the crank.

It is desirable in instruments of this description to repeat the music or tune several times, and sometimes without any intermission. With the single sheet wound on rolls this was not possible; but with my improved endless sheet of perforated music the tune can be repeated with any desired interval between the tune, or successively without interval of time.

It is also desirable to modify the sound and adapt it to the room, the voice, or the expression of the music desired. This can be readily secured by the resonant cover E, which, with simple mechanism, can be raised or lowered to produce the desired effect, and also by the hinged cover F, which can be secured in any desired position.

By the peculiar construction of the case and the driving mechanism, one endless belt or sheet of perforated music can be quickly substituted for another without particular skill or judgment. All the parts are simple and not likely to get out of order.

The endless sheet of perforated paper, prepared cloth, or other suitable material, arranged to form a valve to exclude the air from all the notes or reeds except those to be sounded, can be cheaply prepared and furnished with the instrument, or sold separately, so that on one instrument any tune or composition of music within its range can be performed with an endless sheet or belt perforated to correspond with the notes and their succession and duration, and such piece or pieces can be repeated at pleasure with any desired interval of time, regulated by the motion of the crank.

What I claim as my invention, and desire to secure by Letters Patent, is—

1. The combination, with a perforated music-sheet, of reed-chamber C and exhaust-bellows D D, the perforations in the sheet corresponding with the air-inlets of said reed-chamber, to produce a tone or chord, and otherwise arranged to form a valve to exclude the air from the reeds, except at such perforations, substantially as described.

2. The combination, with the endless perforated sheet *a* and reed-chamber C, of the shaft *d'*, pulleys E E, and pressure-rollers $E^1$ $E^1$, arranged to propel the sheet *a*, substantially as and for the purpose specified.

3. The combination, with the crank *d*, pulleys E E, and rolls $E^1$ $E^1$, of the crank *t*, one or more, arranged to operate the bellows, substantially as and for the purpose set forth.

4. The combination, with the shaft *d'*, of the pulleys E E and rolls $E^1$ $E^1$, when either the pulleys or rolls, or both, are made of elastic or yielding material, and arranged to move the perforated sheet of a musical instrument, substantially as and for the purpose described.

5. The combination, with the shaft *d'* and pulleys E E, of the rolls $E^1$ $E^1$, secured to a hinged or otherwise movable part of the case, and arranged substantially as described, so that the endless sheet can be inserted and passed over the pulleys, and the rolls $E^1$ $E^1$ forced against the sheet, as and for the purpose specified.

6. The combination, with the reed-chamber C, bellows D, and endless sheet *a*, of the case A, provided with the hinged side B, arranged to be secured to the case, and opened to facilitate the insertion of the endless sheet *a*, substantially as and for the purpose set forth.

7. The combination, with a mechanical musical instrument, of the resonant sounding-board or sounding-box $E^3$, made movable for the purpose of facilitating the insertion of the music-sheet.

8. The combination, with a mechanical musical instrument operated by an endless sheet or belt, substantially as shown and described, of an exterior case provided with the hinged end G, arranged to facilitate the substitution of one endless sheet for another, substantially as described.

ELIAS P. NEEDHAM.

Witnesses:
AZRO FOWLER,
C. A. NEEDHAM.